(12) United States Patent
Wilkins

(10) Patent No.: US 6,788,812 B1
(45) Date of Patent: Sep. 7, 2004

(54) TECHNIQUES FOR SELECTIVE ENHANCEMENT OF A DIGITAL IMAGE

(75) Inventor: David C. Wilkins, Providence, RI (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/399,970

(22) Filed: Sep. 21, 1999

Related U.S. Application Data

(60) Provisional application No. 60/140,106, filed on Jun. 18, 1999.

(51) Int. Cl.[7] .................................................. G06K 9/36
(52) U.S. Cl. ........................ 382/167; 382/274; 382/163; 382/166; 358/516; 348/453; 345/22
(58) Field of Search ................................. 382/167, 166, 382/163, 162, 254, 274, 232, 239; 358/518–523, 516; 348/453, 455; 345/22, 83, 106, 549, 530, 589, 591, 593, 600, 604, 612, 690; 430/43; 396/140; 399/94

(56) References Cited

U.S. PATENT DOCUMENTS

| | | | | |
|---|---|---|---|---|
| 4,903,121 A | * | 2/1990 | Uomori et al. | 348/242 |
| 5,063,448 A | | 11/1991 | Jaffary et al. | |
| 5,245,432 A | | 9/1993 | Jaffray et al. | |
| 5,325,200 A | | 6/1994 | Jaffray et al. | |
| 5,687,011 A | * | 11/1997 | Mowry | 358/527 |
| 5,982,926 A | * | 11/1999 | Kuo et al. | 382/167 |
| 5,986,718 A | * | 11/1999 | Barwacz et al. | 348/592 |
| 6,057,931 A | * | 5/2000 | McConnell et al. | 358/1.9 |
| 6,125,213 A | * | 9/2000 | Morimoto | 382/263 |
| 6,215,914 B1 | * | 4/2001 | Nakamura et al. | 382/284 |
| 6,295,115 B1 | * | 9/2001 | Zhang et al. | 355/32 |
| 6,535,301 B1 | * | 3/2003 | Kuwata et al. | 358/1.9 |
| 6,608,941 B1 | * | 8/2003 | Suzuki et al. | 382/272 |
| 6,677,959 B1 | * | 1/2004 | James | 345/660 |
| 2003/0027949 A1 | * | 2/2003 | Yamamoto et al. | 526/88 |
| 2003/0043394 A1 | * | 3/2003 | Kuwata et al. | 358/1.9 |
| 2003/0057887 A1 | * | 3/2003 | Dowling et al. | 315/291 |
| 2003/0058351 A1 | * | 3/2003 | Maeda | 348/223.1 |
| 2003/0086004 A1 | * | 5/2003 | Usami | 348/223.1 |
| 2003/0112334 A1 | * | 6/2003 | Kiyokawa | 348/207.1 |
| 2003/0126125 A1 | * | 7/2003 | Kim et al. | 707/3 |
| 2003/0156194 A1 | * | 8/2003 | Sugiura et al. | 348/187 |
| 2003/0190578 A1 | * | 10/2003 | Lehmann | 433/26 |
| 2003/0193579 A1 | * | 10/2003 | Mori et al. | 348/222.1 |
| 2004/0052076 A1 | * | 3/2004 | Mueller et al. | 362/293 |
| 2004/0056965 A1 | * | 3/2004 | Bevans et al. | 348/222.1 |

\* cited by examiner

*Primary Examiner*—Timothy M. Johnson
*Assistant Examiner*—Barry Choobin
(74) *Attorney, Agent, or Firm*—Michael J. Ferrazano

(57) ABSTRACT

By automatically compensating for unwanted lighting effects caused by varying ambient light sources, digital still images and video are made to appear more naturally realistic. A set of correction factors based upon an ascertained ambient lighting conditions, such as color temperature, provides for selectively color correcting only those pixels requiring correction. In this way, only those portions of a digital image having excessive color due to ambient light conditions are improved without affecting those portions of the digital image not requiring correction.

13 Claims, 15 Drawing Sheets

(4 of 15 Drawing Sheet(s) Filed in Color)

TECHNIQUES FOR SELECTIVE ENHANCEMENT OF A DIGITAL IMAGE

CROSS REFERENCE TO RELATED APPLICATION

This application claims benefit of priority under 35 U.S.C. §119(e) of U.S. Provisional Application No. 60/140,106, filed Jun. 18, 1999, and entitled "REMOVAL OF INCANDESCENT AND FLUORESCENT LIGHTING EFFECTS FROM DIGITAL IMAGES" which is hereby incorporated by reference.

BACKGROUND OF THE INVENTION

1. Field of Invention

The invention relates generally to digital image processing systems. More particularly, methods and apparatus for selectively enhancing a digital image are disclosed. More particularly, the invention provides light source color correction techniques suitable for use in both digital still and video image photography.

2. Description of Relevant Art

The color quality of light sources in general can be stated in terms of color temperature that defines the color of a light source relative to the visual appearance and is typically expressed in degrees Kelvin (° K). More specifically, color temperature refers to the color of a blackbody radiator at a given absolute temperature. A blackbody radiator changes color as its temperature increases, first to red, then to orange, yellow, and finally bluish white at the highest temperature. Table 1 lists a variety of light sources and their corresponding color temperature in degrees Kelvin(° K).

TABLE 1

| Source | Degrees K. |
|---|---|
| Artificial Light | |
| Match Flame | 1700 |
| Candle Flame | 1850 |
| 40-Watt Incandescent Tungsten Lamp | 2650 |
| 75-Watt Incandescent Tungsten Lamp | 2820 |
| 100-Watt Incandescent Tungsten Lamp | 2865 |
| 500-Watt Incandescent Tungsten Lamp | 2960 |
| 200-Watt Incandescent Tungsten Lamp | 2980 |
| 1000-Watt Incandescent Tungsten Lamp | 2990 |
| 3200-Degree Kelvin Tungsten Lamp | 3200 |
| Molarc "Brute" with Yellow Flame Carbons & YF-101 Filter (approx.) | 3350 |
| "C.P." (Color Photography) Studio Tungsten Lamp | 3350 |
| Photofloodor Reflector Flood Lamp | 3400 |
| Daylight Blue Photoflood Lamp | 4800 |
| White Flame Carbon Arc Lamp | 5000 |
| High-Intensity Sun Arc Lamp | 5500 |
| Xenon Arc Lamp | 6420 |
| Daylight | |
| Sunlight: Sunrise or Sunset | 2000 |
| Sunlight: One Hour After Sunrise | 3500 |
| Sunlight: Early Morning | 4300 |
| Sunlight: Late Afternoon | 4300 |
| Average Summer Sunlight at Noon (Washington, D.C.) | 5400 |
| Direct Mid-Summer Sunlight | 5800 |
| Overcast Sky | 6000 |
| Average summer Sunlight (plus blue skylight) | 6500 |
| Light Summer Shade | 7100 |
| Average Summer Shade | 8000 |
| Summer Skylight Will Vary From | 9500 to 30000 |

It should be noted that in reference to Table 1, sunlight is the light of the sun only whereas daylight is a combination of sunlight plus skylight. The values given are approximate because many factors affect color temperature such as the sun angle, and the conditions of the sky-clouds, haze, dust particles-raise or lower the color temperature. With indoor lighting, lamp age (and blackening), voltage, type of reflectors and diffusers affect tungsten bulbs; all of these can influence the actual color temperature of the light.

With conventional film photography, the color temperature of the ambient light source can, and usually does, has a significant effect on the finished product. By way of example, referring to Table 1, a photograph taken with standard daylight film in daylight (color temperature 8000° K) will typically exhibit what is typically referred to as "natural" colors since the peak of the daylight spectrum is skewed to the blue end of the visible light spectrum. However, in the event that the same film is used to take a photograph in a room illuminated by a standard tungsten filament incandescent light source (color temperature approximately 2900–3000° K), the photograph produced will more than likely have a yellowish cast. This yellowish cast is due to the fact that the light produced by a tungsten filament has a spectrum skewed to the yellow portion of the visible light spectrum. Conventional techniques well known to those skilled in the art of photography that attempt to compensate for the differences in ambient light color temperatures include the use of specially formulated film and/or the use of special filters that are physically attached to a camera.

Take, for example, the case where standard daylight film (i.e., film formulated for use in a color temperature range corresponding to daylight) is used to take a photograph in a room illuminated by a tungsten filament incandescent lamp. In this case, a special tungsten filter can be used to compensate for the difference in color temperature of the light produced by the tungsten lamp as compared to standard daylight for which the film was originally formulated. In this way, the photographic film is exposed to light more closely resembling standard daylight. In another case, when shooting a photograph in evening or night conditions under incandescent lighting (when a flash is not used), a yellowish cast can be readily seen. Again, a conventional attempt to correct this problems relies on the use of tungsten film or special filters.

Another approach commonly followed is to use specially formulated "tungsten" film that is specially formulated to absorb particular portions of the visible light spectrum of the light produced by the tungsten filament lamp. The disadvantage to this approach is that if this film is used outdoors, or in a room illuminated by, for example, a xenon lamp, then different color temperature correction is typically required. These particular approaches to color temperature compensation are potentially expensive and time consuming since additional equipment (such as filters) and/or film suitable for the particular ambient light conditions must be readily available to the photographer.

Although, either, or both, of these (and other) techniques have and can be used to color compensate for differing ambient light sources in conventional film photography, these techniques are not particularly useful with digital photography. Since digital cameras and the like use photoreceptors (CCD, CMOS, etc) as a form of digital film to capture the image in the form of photons, it is impossible to use "special" film to accommodate different ambient light conditions. Since a digital camera is limited to those photoreceptors originally included in the camera, the only realistic alternative is to use "on the lens" filters to compensate for the color temperature of the ambient light source. Unfortunately, "on the lens" filters for digital cameras can be expensive and difficult to use and as yet are not readily available. As with conventional film photography, since "on the lens" filters absorb a particular range of color, the entire photograph is thereby altered even in those select portions of the photograph where color correction is not needed.

Recently, attempts at after the fact color correction have come to the fore. More particularly, IntellihancePro™ manufactured by the Extensis Corporation of Portland, Oreg. and Adobe Photoshop™ manufactured by the Adobe Corporation of Mountain View, Calif. provide algorithms that provide some rudimentary color correction. In the case of IntellihancePro™, the removal of fluorescent lighting effects is very poor. Unfortunately, these algorithms can only be utilized on computing systems having substantial processing and memory capabilities (such as desktop computers) and as such can not be embedded in devices such as cameras, scanners, and the like. However, even with the use of substantial memory and processing, these products are still substantially manual in nature and provide little or no automatic color correction.

Also well known in the art, white balance is the adjustment of a camera so that it shows white parts of the picture without any color tint. However, in order to determine what is "white," the electronics in the camera must be shown a white reference point under ambient light conditions. If this is done manually, then every single time light sources are changed, a new white balance must be determined, otherwise, the camera thinks white is what it saw under fluorescent lights when shooting in warm sunny summer sunlight, for example. Therefore, by adjusting the white balance on the camera it is ensured that colors are reproduced accurately since without proper white balance, camcorders, for example, would show the color as it truly is i.e. bluish in sunlight and reddish in normal room lighting.

Recently developed automatic white balance circuitry available in most digital cameras, such as camcorders, although an improvement over performing white balancing manually, sometimes simply does not give exactly the right result. For example, fluorescent lights can cause problems and fool the white balance system leaving a greenish tinge that can make people look ill. These problems then require "after taken" processing to further "clean up" the image. Other problems can be caused when multiple cameras are being used to record the same event. If each camera has a slightly different color balance, then the resulting images will not color match.

Therefore, what is desired is an efficient method and apparatus for producing a color corrected digital image both in real time as well as for "after taken" digital images that can be used in any suitable display device. Such display devices include TV displays, computer displays, still cameras (both digital and analog), digital video, and the like.

SUMMARY OF THE INVENTION

The invention relates to an improved method, apparatus and system for real-time enhancement of digital images. Broadly speaking, the invention relates to an improved method, apparatus and system for automatic real-time color temperature correction of digital images. In one implementation, the invention determines the particular ambient light conditions under which a captured digital image has been taken. Once a characteristic color temperature is ascertained, a set of correction factors are retrieved based upon the ambient color temperature. The captured digital image is then converted to a particular color space, which in a preferred embodiment is one of a number of hue-based color spaces. Such hue-based color spaces include, but are not limited to: Hue, Saturation, and Value (HSV), Hue, Saturation, and Intensity (HSI) and Hue, Lightness, Saturation (HLS), Hue, Saturation, and Brightness(HSB), Tek HVC (Hue, Value, Chroma). If the number of pixels in the digital image having its hue component within a specified range and whose saturation value is greater than a saturation threshold is greater then a pixel count threshold value, then the digital image is considered to exhibit an undesirable lighting effect and is color corrected. Otherwise, the original digital image is output to a display device.

In the case where the number of pixels in the digital image having both their respective hue component within the specified range and saturation value greater then a saturation threshold value, the digital image is color corrected. In this case, each pixel is color corrected or not based upon the particular color correction factors. The color-corrected image is then available for viewing on the display device.

The present invention is especially well suited for the removal of incandescent and fluorescent lighting effects from images. The present invention is also well suited for removing the yellowish-orange cast due to tungsten filament incandescent lighting as well as the blue/greenish cast due to fluorescent lighting.

These and other advantages of the present invention will become apparent upon reading the following detailed descriptions and studying the various figures of the drawings.

BRIEF DESCRIPTION OF THE DRAWINGS

The file of this patent application contains at least one drawing executed in color. Copies of this patent with color drawing(s) will be provided by the Patent and Trademark Office upon request and payment of the necessary fee.

The invention, together with further advantages thereof, may best be understood by reference to the following description taken in conjunction with the accompanying drawings in which.

DETAILED DESCRIPTION OF THE EMBODIMENTS

Figure 1:
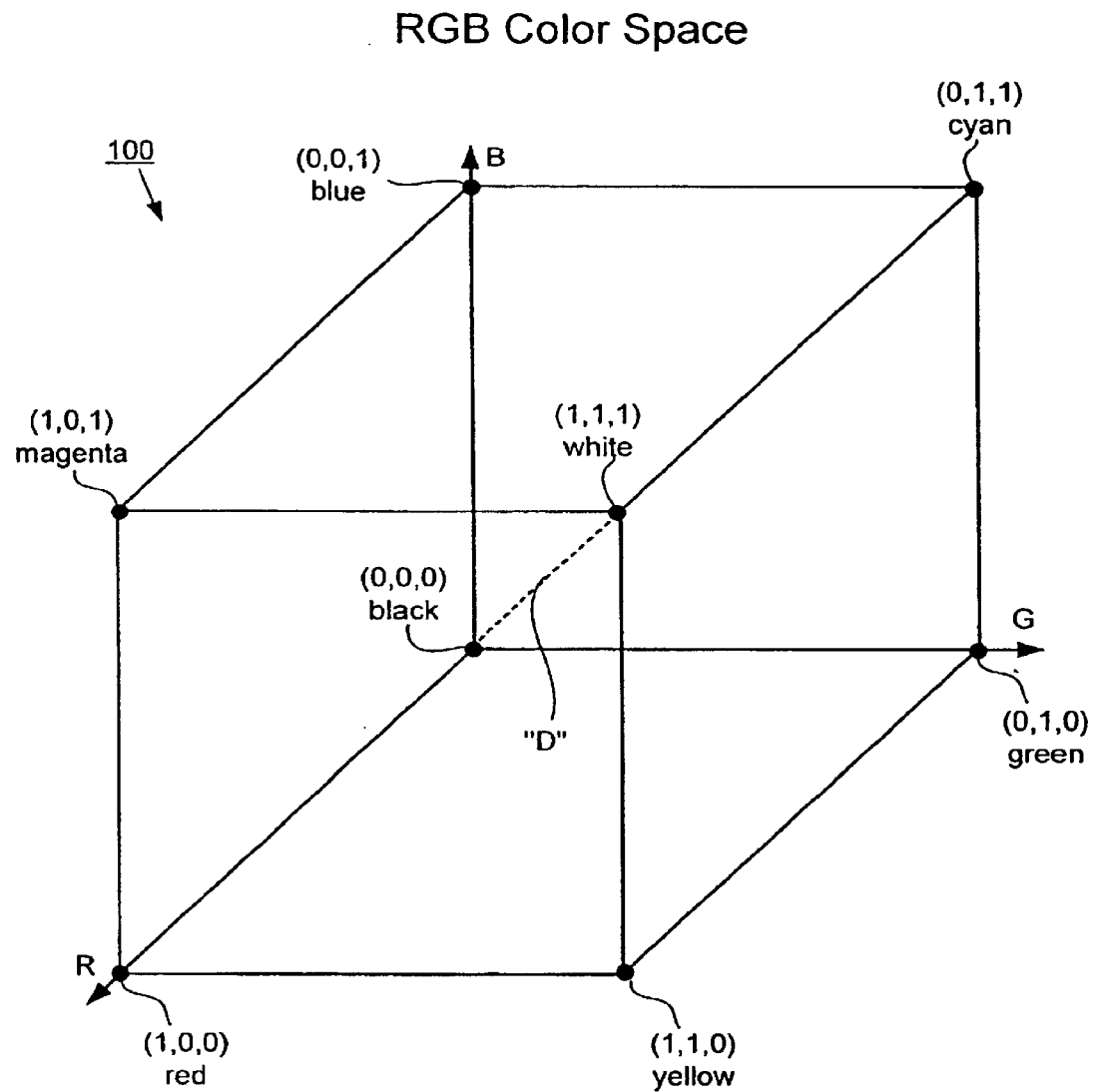
FIG. 1 illustrates a color cube representing a prior art RGB color space.

Broadly speaking, the invention relates to an improved method, apparatus and system for automatic real-time color temperature correction of digital images. In one implementation, the invention, as part of a digital camera system, determines the particular ambient light conditions under which a digital image is being taken. In one embodiment, a photometer, or other such device, determines the characteristic color temperature of the ambient light. Once the characteristic color temperature is ascertained, a set of color correction factors are retrieved. The set of color correction factors can be provided manually, or stored in memory coupled to the digital camera system. In any case, if not already done so, a captured digital image is converted to a particular color space, which in a preferred embodiment is one of a number of hue-based color spaces. Such hue-based color spaces include, but are not limited to: Hue, Saturation, and Value (HSV), Hue, Saturation, and Intensity (HSI) and Hue, Lightness, and Saturation (HLS). If the number of pixels in the converted image having its hue component within a specified range and whose saturation component is greater than a saturation threshold is greater than the pixel count threshold, then the image is considered to exhibit an undesirable lighting effect and is color corrected. Otherwise, the digital image in its original digital image format is output to a display device.

By evaluating the saturation component on a pixel by pixel basis, color correction is more efficient since only those pixels have a saturation above a certain value are deemed important enough to be color corrected. By important enough, it is meant that if a particular pixel's saturation value is too low, then regardless of the hue component, that pixel's contribution to the visible image will be negligible and can therefore be left uncorrected. In this way, valuable computing resources are preserved. In addition, with the ability to distinguish each pixel's saturation value, it is possible to iteratively remove a particular hue without causing the image to take on a "washed out" appearance common to conventional approaches to hue based color correction schemes.

In the case where the digital image is color corrected, each pixel having its hue component within the specified hue range and whose saturation component is greater than a saturation threshold is color corrected based upon the particular color correction factors that include a saturation adjustment value and optional hue adjustment and lightness adjustment values. The color corrected image is then returned to its original digital image format and output to the display device.

The term primary colors refers to three colors that are sufficient to create a gamut of colors—the colors expected to be seen in nature. An example of primary colors are red, green, and blue. The sum of all three of the primary colors—that is, the mixture of all three colors in equal parts—should form the color white. Alternatively, the absence of all three colors creates black. Complementary colors are two colors that, when mixed, become the color white, for example, blue and yellow are two such colors. Color monitors use this idea to create colored images. They use three different types of phosphor prisms at each pixel point on the screen; each type produces one of the three primary colors. The primary colors used by color television monitors (on which computer monitors were originally based) are red, green, and blue. The complements of these three colors are cyan, magenta, and yellow, respectively. Most discussions of color in digital imaging are based on these six colors in some way.

The term brightness/lightness describes the intensity of a color on a scale from 0.0 (dark) to 1.0 (bright) and is sometimes referred to as value. A black-and-white monitor, for example, can only show intensity, using 0 for black and 1 for white, with all the possible grays lying between. Hue is the term used to distinguish the dominant color as perceived by an observer and is related to its dominant wavelength. Saturation or chroma defines the purity of the color; for instance, pure blue is a more vivid color than pale blue (blue combined with white).

A number of color models have been developed that attempt to represent a gamut of colors, based on a set of primary colors, in a three-dimensional space. Each point in that space depicts a particular hue; some color models also incorporate brightness and saturation.

One such model is referred to as the RGB (Red, Green, Blue) color model. A common representation of the prior art RGB color model is shown in the FIG. 1. Since the RGB color model is mapped to a three dimensional space based upon on a cube 100 with Cartesian coordinates (R,G,B), each dimension of the cube 100 represents a primary color. Similarly, each point within the cube 100 represented by a triplet (r,g,b) represents a particular hue where the coordinates (r,g,b) show the contributions of each primary color toward the given color. For sake of simplicity only, it is assumed that all color values are normalized so that the cube 100 is a unit cube such that all values of R,G, and B are in the range of [0,1].

In the described embodiment, the first coordinate (r) represents the amount of red present in the hue; the second coordinate (g) represents green; and the third (b) coordinate refers to the amount of blue. Since each coordinate must have a value between 0 and 1 for a point to be on or within the cube, pure red has the coordinate (1, 0, 0); pure green is located at (0, 1, 0); and pure blue is at (0, 0, 1). In this way, the color yellow is at location (1, 1, 0), and since orange is between red and yellow, its location on this cube is (1, ½, 0). It should be noted that the diagonal D, marked as a dashed line between the colors black (0, 0, 0) and white (1, 1, 1), provides the various shades of gray. As is readily seen in FIG. 1, the complementary colors in the RGB color space, cyan, magenta, and yellow, are found at the three other corners of the cube 100.

In digital systems capable of accommodating 8-bit color (for a total of 24-bit RGB color), the RGB model has the capability of representing $256^3$, or more, than sixteen million colors representing the number of points within and on the cube 100.

Since the RGB color space is represented by a cube, images in the RGB color space consist of three independent image planes, one for each primary color. When fed into an RGB monitor, for example, these three images combine on the phosphor screen to produce a composite color image.

This makes the use of the RGB color space very useful when displaying digital images on a conventional computer display, for example.

However, when using the RGB color space to represent a digital image, each pixel has associated with it three color components representing one of Red, Green, and Blue image planes. In order, therefore, to color compensate a digital image by removing, for example, excess yellow due to tungsten filament based illumination, all three color components in RGB color space are modified since each of the three image planes are cross related. Therefore, when removing excess yellow, for example, it is difficult to avoid affecting the relationship between all primary colors represented in the digital image. The net result being that important color properties in the image, such as flesh tones, typically do not appear natural when viewed on an RGB monitor.

It is realized then, that the RGB color space may not be best for enhancing digital images. Advantageously, the present invention realizes that an alternative color space, such as a hue-based color space, may be better suited for addressing this technical problem. Although hue-based color spaces are known in the art, it is believed that their applicability to automatic color correction (such as removing the yellowish cast due to tungsten filament incandescent light) has heretofore not been realized due to the large computational and memory resources required.

Therefore, it is preferable when enhancing a digital image by, for example, color correction, to convert the digital image from the RGB color space to a different color space more representative of the way humans perceive color. Such color spaces include those based upon hue since hue is a color attribute that describes a pure color (pure yellow, orange, or red). By converting the RGB image to one of a hue-based color space, the color aspects of the digital image are de-coupled from such factors as lightness and saturation. In this way, various image enhancement techniques, such as histogram equalization, can be employed that affect lightness but do not affect hue. In addition, when applying color correction techniques, only the hue component is affected thereby greatly simplifying the color correction process as well as producing a final product more in line with human color perception.

Figure 2:
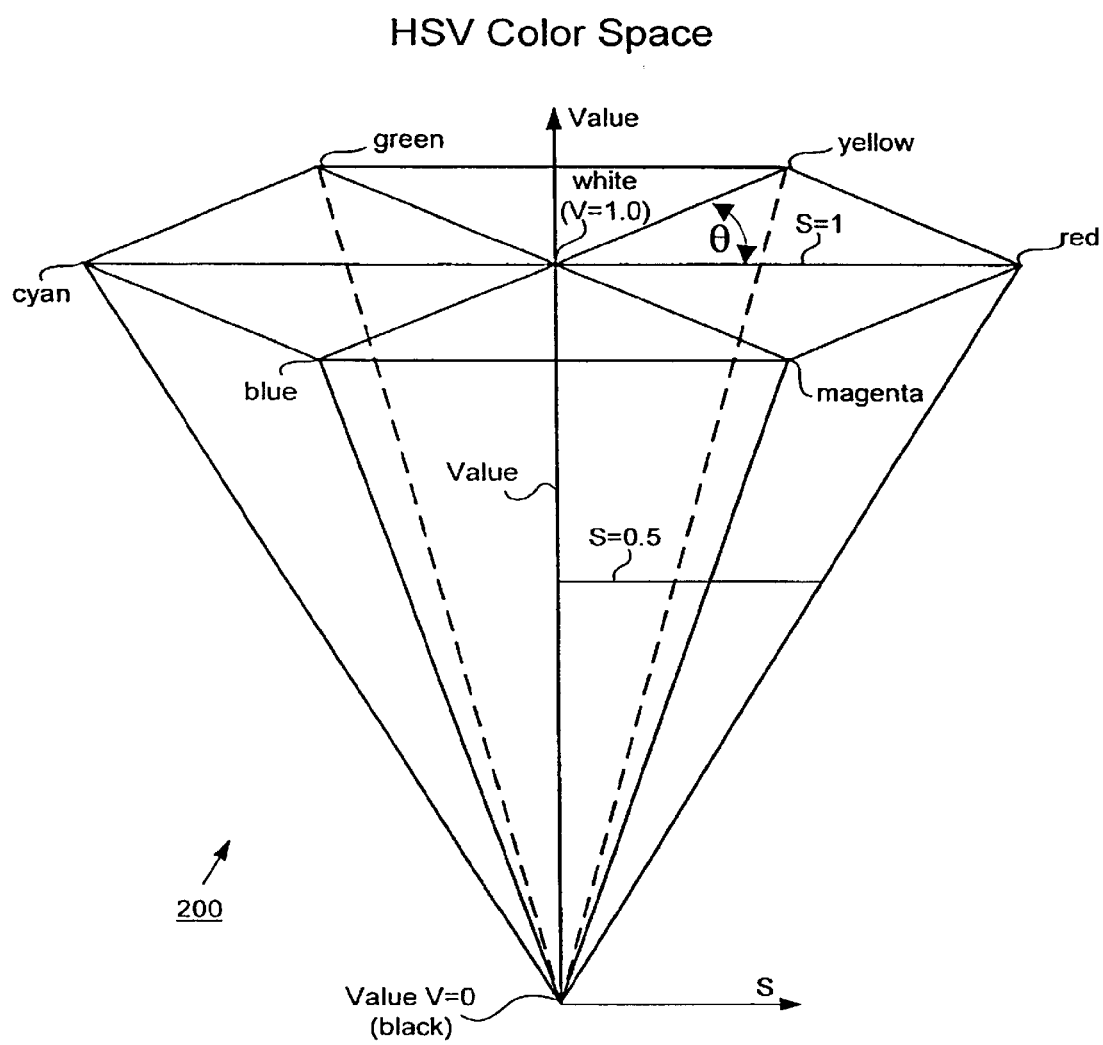
FIG. 2 illustrates a hex cone representing a prior art HSV color space.

One such known hue-based color space is referred to as the HSV (Hue, Saturation, Value) color model represented by a cone 200 as shown in FIG. 2. This is one of the perceptual color spaces and was designed to mimic the way humans perceive color. The HSV color cone 200 defines a color by hue, saturation, and value (brightness). The value or brightness of the color varies from zero to one along the Value axis, and the saturation S of the color varies as the radial distance from the center Value axis. The hue H is represented as an angle θ with θ=0 degrees being defined as pure red. The other primary colors are 120 degrees apart. By way of example, green is 120 degrees from red and blue is 240 degrees from red. The centerline from V=0.0 to V=1.0, between the colors black and white, respectively, provides all the shades of gray. Saturation values also vary from S=0.0 to S=1.0. Since the parameters are all real numbers, the range of colors available should be infinite, but in fact, are limited by the precision of the machine being used.

Figure 3:
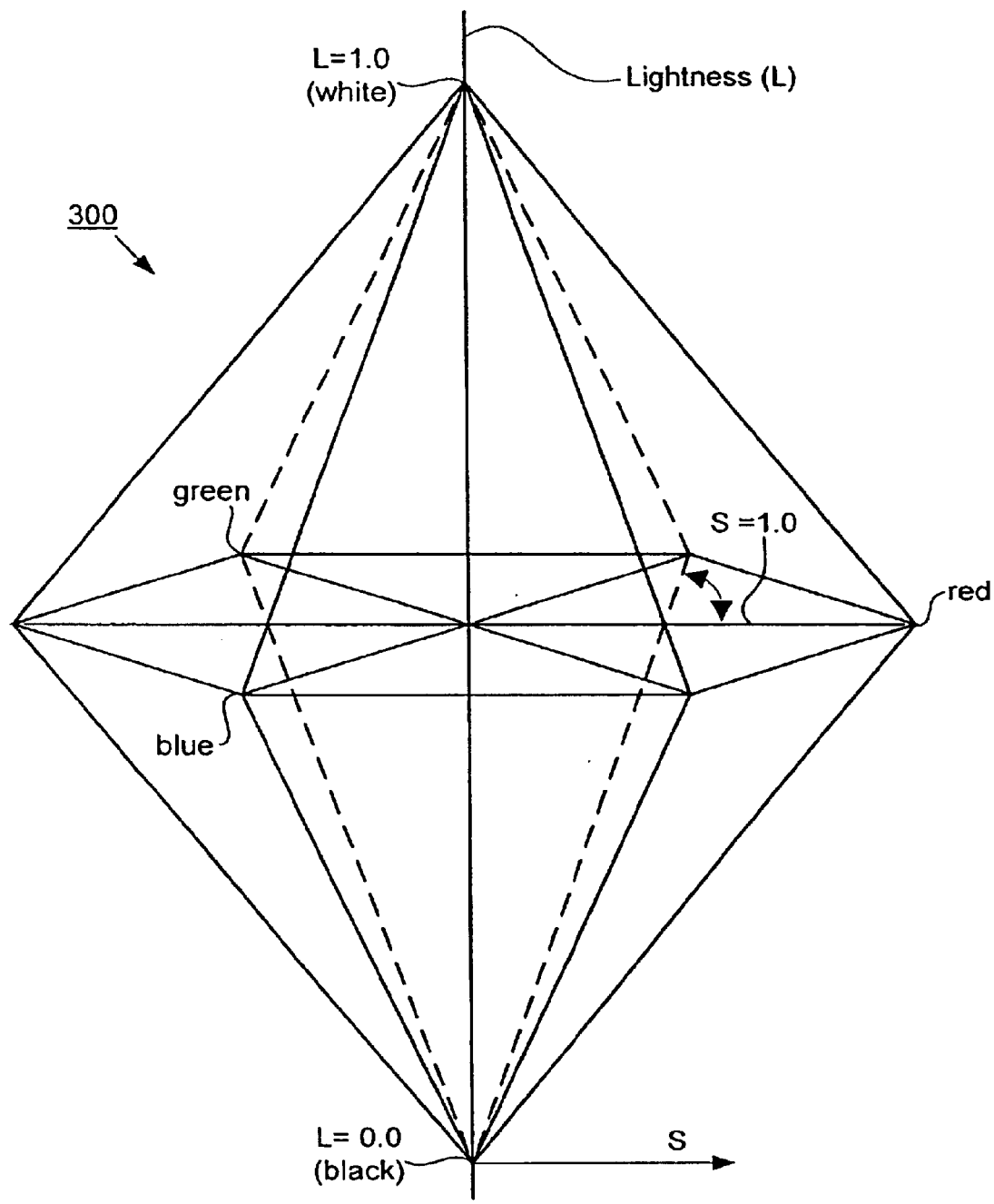
FIG. 3 illustrates a double hex cone representing a prior art HLS color space.

Another such color model is referred to as the HLS (Hue, Lightness, Saturation) color model and is shown in double hexcone 300 of FIG. 3. This is another perceptual color space and similar to the HSV cone 200 but with the colors of black and white acting as ends of the cones. Here the term, lightness L, is related to brightness or intensity. Again, the L-axis from L=0.0 to L=1.0, between the colors black and white, respectively, provides the shades of gray. The values for saturation S vary from 0.0 to 1.0. As with the HSV model, the number of colors describable using this model is virtually infinite.

Figure 4:
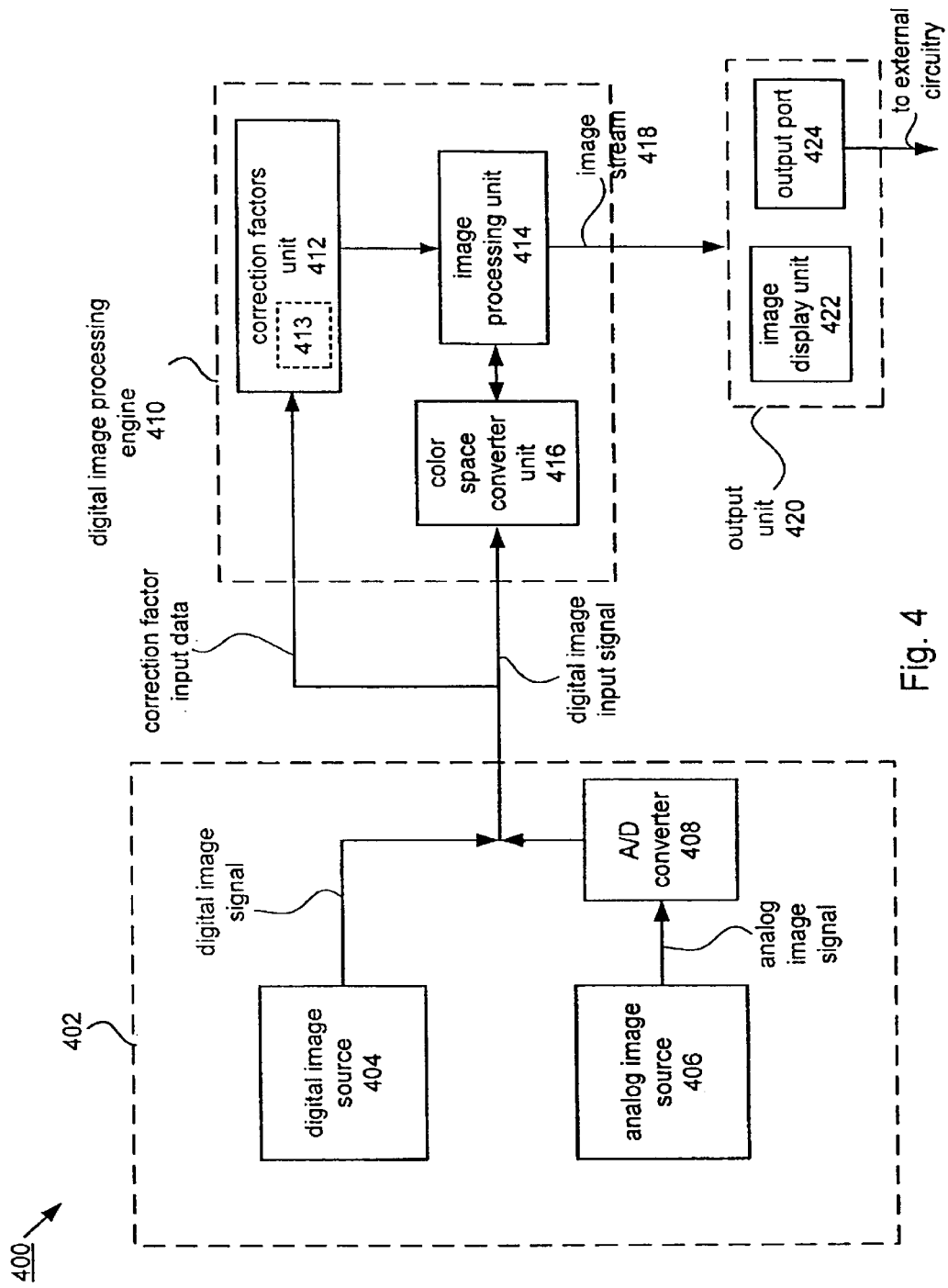
FIG. 4 is a block diagram of a digital image processing system in accordance with an embodiment of the invention.

Referring now to FIG. 4, a block diagram of a digital image processor system 400 in accordance with an embodiment of the invention is shown. Digital image processor system 400 includes an image source 402 arranged to provide any number of digital or analog image input signals for processing. The image source 402 can provide a digital image stream that can take the form of a still image (having a format such as JPEG or TIFF) as well as video from, for example, a digital television (DTV), the Internet (also commonly referred to as the WEB), and the like. In this way, a digital image source 404 can provide any number and type of well-known formats, such as, JPEG, BMP, TIFF, BNC composite, serial digital, parallel digital, RGB, or consumer digital video. When the digital image source 404 is a digital television, the input signal is a digital video signal having any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video. Alternatively, as an analog image source 406, the analog signal provided includes analog signals derived from, for example, an analog television, still camera, analog VCR, DVD player, camcorder, laser disk player, TV tuner, scanner, settop box (with satellite DSS or cable signal), game machines, imaging kiosks, as well as the WEB, and the like.

In order to convert the analog signal provided by the analog image source 406 to an appropriate digital signal, an analog-to-digital converter (A/D) 408 coupled to the analog image source 406 converts an analog voltage or current signal into a discrete series of digitally encoded numbers (signal). In this way, a digital image data word suitable for digital processing is thereby generated. Any of a wide variety of A/D converters can be used, such as for example those manufactured by: Philips, Texas Instrument, Analog Devices, Brooktree, and others.

In the described embodiment, a digital image processing engine 410 coupled to the image source 402 is arranged to receive the digital image signal and process the embedded digital image. Such an engine can be implemented as described in more detail with reference to FIGS. 6–10. As part of, or coupled to, the digital image processing engine 410, a correction factors unit 412 supplies image correction factors 413 that are used by an image processing unit 414 included in the digital image processing engine 410 to process the received digital image. The correction factors 413 can include, for example, color correction factors that, for example, compensate for ambient light color temperature and threshold values for determining whether or not an image is to be corrected, as well as the extent any such corrections are performed.

In the described embodiment, the correction factors 413 provided by the correction factors unit 412 are selected based upon information included in the digital image input signal. In the example of color correcting for a tungsten filament light source, a photosensor array (not shown) determines the ambient color temperature by ascertaining the predominant wavelength of the ambient light. This information is then encoded into the digital image input signal that is used by the correction factor unit 412 to provide appropriate color correction factors, if required, to the image processing unit 414. In some embodiments, however, a user can manually input whatever correction factors are deemed appropriate or the user can opt to not correct the digital image at all. For example, a user can input the type of light used to take a particular photograph, then using a look up table (LUT) similar to Table 1, the particular color temperature associated with that light source can be supplied. Using this approach greatly simplifies the overall design since there is no need to include a photosensor in the image processing system 400. However, when manual inputs are supplied, it is the user that is required to provide the proper settings which has the potential for introducing errors in the finished product's appearance.

In the case where the digital input signal is based on an RGB color space (typical of most color cameras and the like), a color space converter unit 416 provides the necessary color space conversion from the RGB color space to, for example, a hue-based color space such as HLS. Of course, the correction factors 413 included in the correction factor unit 412 must be aligned with and correspond to whichever color space the digital image provided by the image source 402 is ultimately converted.

Once the digital image corresponding to the digital input signal is converted to the appropriate color space, the image processing unit 414 outputs an image stream 418 that, in some cases, includes a corrected and/or enhanced version of the digital image embedded in the digital image input signal to an output unit 420. In some embodiments, the output unit 420 includes an image display unit 422 capable of displaying the image embedded in the image stream 418. The output unit 420 can also include an output port 424 capable of being coupled to external circuitry (not shown) such as a computer that, in turn, provides an appropriate display apparatus. In the described embodiment, the output port 424 includes I/O ports such as a parallel port, a serial port, a system bus, a USB port, a TV signal output port, a PCMCIA port, as well as a modem port. As such, the output port 424 can also be arranged to transmit the image stream 418 (in a format such as raw RGB, JPEG, TIFF, etc.) to an interconnected network of computers (such as the Internet). In this way, any of the interconnected computers can be used to, for example, view the image embedded in the image stream 418 thereby allowing any number of end-users to view the embedded image.

In some embodiments, the image processing unit 414 determines, or is instructed, that the received digital image is not to be processed. In one implementation, the digital image (in its original image format) is stored in a memory device (not shown) that is coupled to image source 402 and the digital image processing engine 410. The original image stored in the memory device can be, after appropriate decompression and/or color space conversion, output directly to the image display unit 422 or sent to another system by way of the output port 424. However, in those situations where no memory device is available, the unprocessed digital image is reconverted back to the original color space (if necessary) by the color space converter 416 and then, if desired, forwarded to the image display unit 422 or the output port 424.

In some situations, however, the image display unit 422 requires an image in a different color space than the original. In these cases, the color space converter unit 416, using well know techniques, provides the necessary conversion. For example, if the original image was taken by a digital camera in RGB color space and the image display unit 422 is a color laser printer, then the image is converted to a color space compatible with the color laser printer, such as CMYK (Cyan, Magenta, Yellow, Black). Alternatively, when the image display unit 422 is a standard analog TV, a digital TV, computer monitor, and the like, the provided digital image is converted to YIQ format.

Figure 5:
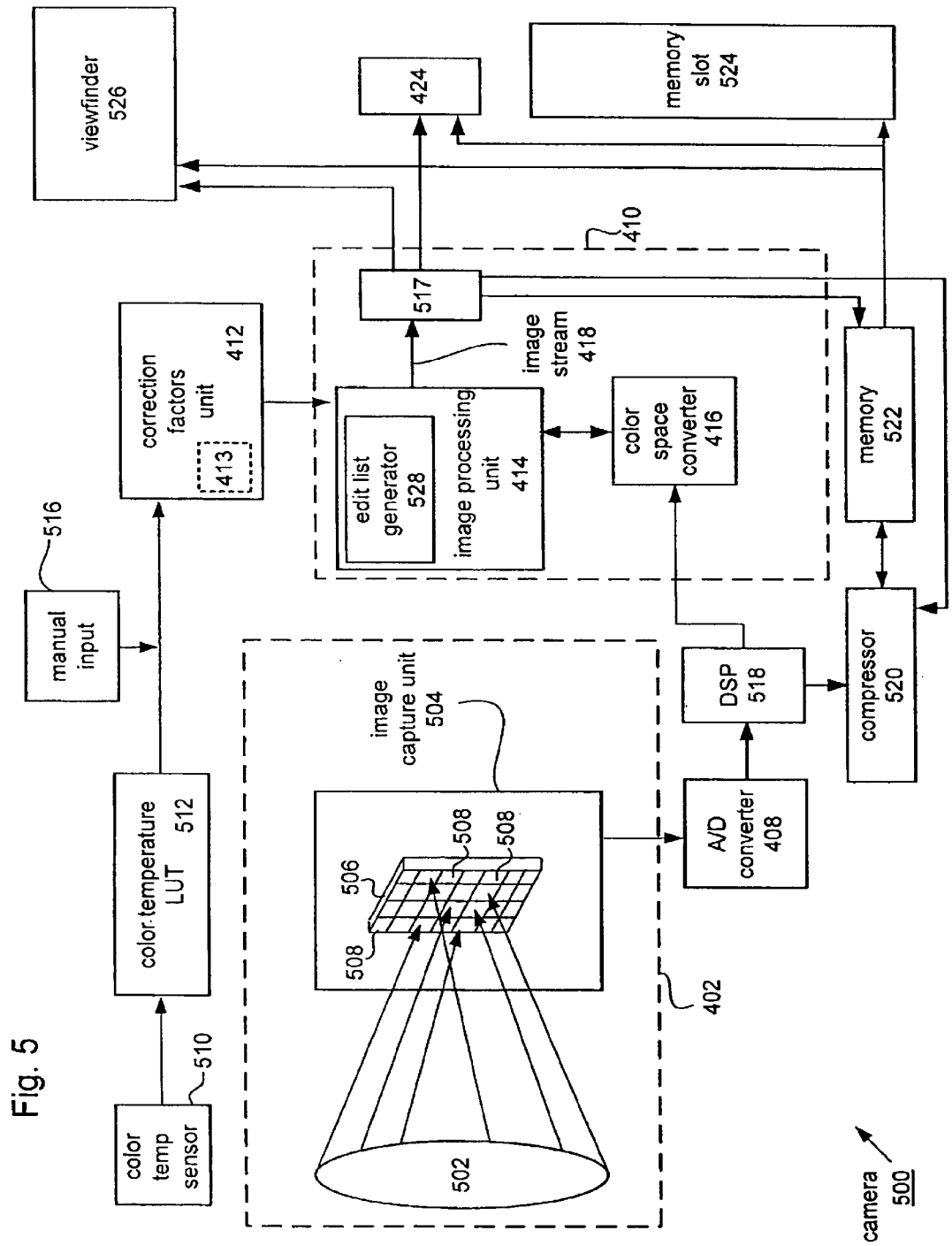
FIG. 5 is a block diagram of an exemplary digital camera system in accordance with an embodiment of the invention.

The invention will now be described in terms of a digital camera system that can take the form of either a still or a video camera system. Referring to FIG. 5, a digital camera system 500 incorporating one embodiment of the invention is described. Typically, the digital camera system 500 includes the image source 402 that includes an optical lens 502 for focusing light rays onto a imaging capture unit 504. The imaging capture unit 504 typically relies upon an array of light sensitive photo optic cells 506 capable of converting the light rays, in the form of photons, received from the optical lens 502 into representative analog signals. Most commonly, the photo optic cells take the form of charge coupled devices (CCDs), although other devices such as CMOS receptors may be used as well.

As is well understood in the art, each CCD array 506 has associated with it a specific color filter array (CFA) 508. In most applications, the CFA 508 is an empirically derived pattern of individual color filters each associated with a specific CCD cell in the CCD array. In some embodiments, a color temperature sensor 510 ascertains the color temperature of the ambient light by evaluating, in one embodiment, the predominant frequency of the ambient light spectrum. In one embodiment, a color look up table (LUT) 512 is then used to determine the color temperature of the ambient light. The output of the color temperature LUT 512 provides an input signal to a correction factors unit 412 that is arranged to provide appropriate correction factors based upon the received color temperature. In some embodiments, a manual input 516 can be used to bypass or even do away with the color temperature sensor 510 and the color temperature LUT 512 by allowing a user to pre-select the appropriate color temperature settings based upon the light source(s) being used which are fed directly to the correction factors unit 412. For example, the user can pre-select a tungsten filament light source as the predominant illumination which is then converted to an appropriate color temperature using, for example, a LUT along the lines of Table 1. This is useful in a situation where a user may push a button on a camera to have it automatically enhance pictures taken indoors, for example.

When the analog signals representative of the captured image are produced by the image capture unit 504, they are sent first to an analog to the digital (A/D) converter unit 408 which converts the representative analog signals into digital signals representative of the image. The digital signals are then passed to a digital signal processor (DSP) 518 where they are converted to an appropriate digital format. By way of example, if the A/D converter 408 is capable of producing a 24-bit RGB data word (i.e., 8-bits per primary color), then the DSP 518 will produce a corresponding 24-bit data word representing the color component of one pixel in the digital image.

In some embodiments of the invention, an image compression circuit 520 as well as a memory 522 both receive the appropriately formatted digital signals. The image compression circuit 520 operates to digitally compress the received digital images in order to reduce the amount of resources required to further process the digital signals. One such formatting scheme referred to as JPEG is commonly used, although there are a wide variety of suitable picture formats.

In one embodiment, the digital image stored in the memory 522 can be sent by way of a memory interface (not shown) to a memory slot 524 capable of receiving a memory card suitable for storing the processed digital signals. Such memory cards include "floppy" disks, flash EPROM cards, R/W compact disc (CD), SmartMedia, DVD, DAT, and the like. Alternatively, the digital image stored in the memory 522 can be sent to external circuitry, such as a computer, by way of the output port 424 for viewing or, in some cases, additional image processing. In the situation where a number of images are stored in the memory 522, a user can pre-select any number of images for additional processing by viewing the images (generally in a thumbnail form) using a viewing device such as a viewfinder 526.

In the case where the digital image is to be processed by the digital image processing engine 410, the digital image is first converted from the original color space (typically RGB) to a hue-based color space (such as HSV) by the color space converter 416 coupled to the DSP 518. By converting the digital image to a hue-based color space, for example, processing the digital image is greatly simplified. Once the digital image has been processed by the image processing unit 414 using correction factors provided by the correction factors unit 412 to form the image stream 418, it is converted to a color space appropriate to the anticipated output device by the color space converter 416. For example, if the image embedded in the image stream 418 is to be displayed on the viewfinder 526, the digital image would be converted back to RGB color space. On the other hand, if the processed digital image is to be displayed on, for example, a color printer, either color inkjet or color laser, for example, then the processed image would be converted to, for example, CMYK color space. It is therefore, one of the advantages of the invention to be capable of producing a processed digital image capable of being displayed on any number and types of image displays.

After appropriate color space conversion has been performed, the digital image is passed to a selector unit 517 which directs the image stream 418 to a predetermined output device, such as the viewfinder 526 or the output port 424. In some cases, the processed image can be stored in the memory 522 for subsequent viewing or additional processing.

Alternatively, if it is determined that the digital image is not to be processed by the image processing unit 414, then the image stored in the memory 522 can be directly sent to either the display unit 526, to a device coupled to the memory slot 524, or to external circuitry, such as a computer, by way of the output port 424.

Figure 6:
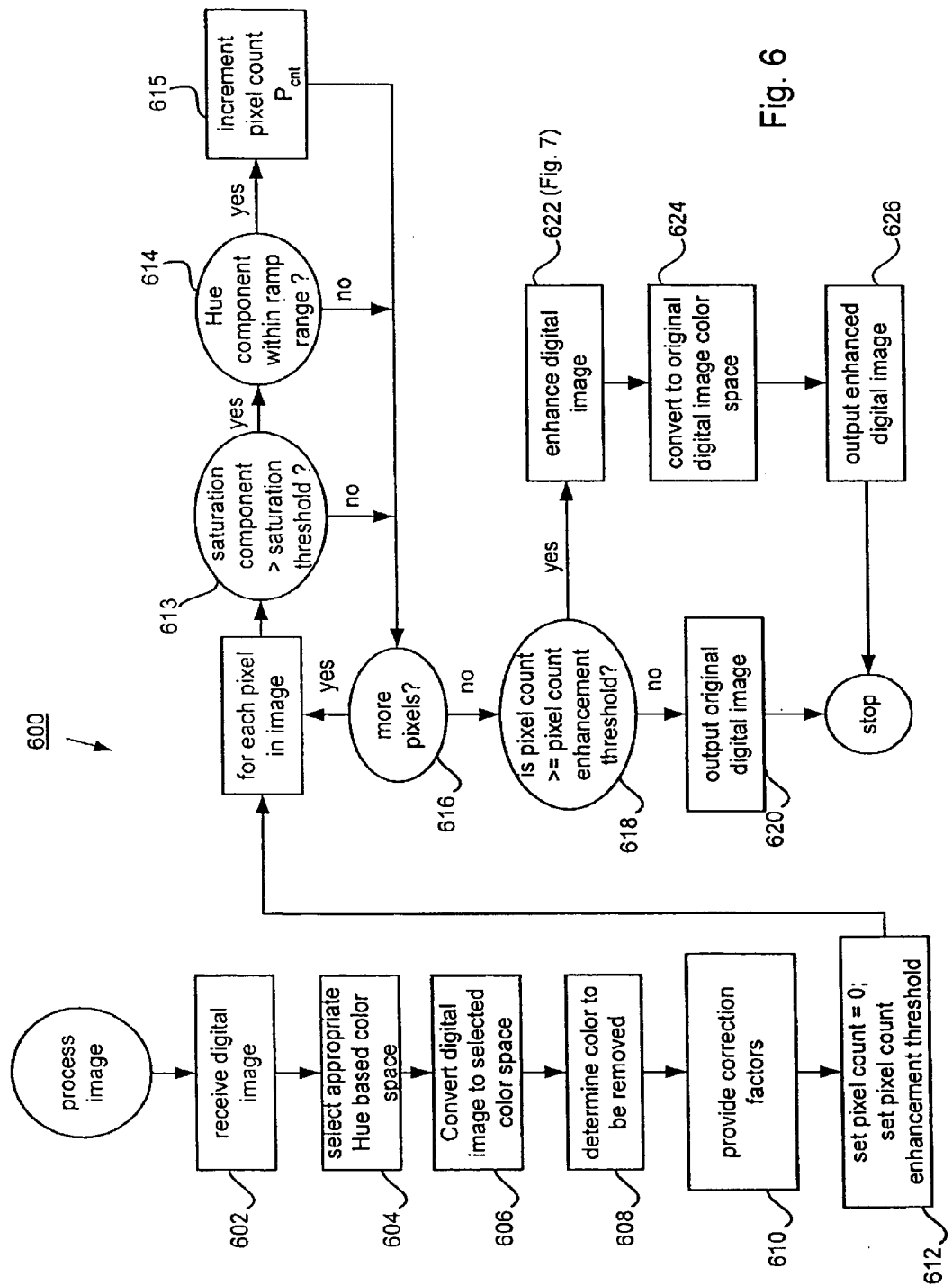
FIG. 6 shows a flowchart detailing a process for enhancing a digital image in accordance with an embodiment of the invention.

Referring now to FIG. 6, a flowchart is shown detailing a process 600 for enhancing a digital image in accordance with an embodiment of the invention. FIG. 6 provides one possible technique for implementing the image processing engine 410. The process 600 begins at 602 when the digital image is received. Once the digital image has been received, an appropriate hue-based color space is selected at 604 after which the digital image is converted to the selected color space at 606. Based upon ambient light conditions, for example, a determination is made at 608 which color is to be removed. This determination can be based upon many factors, not the least of which is the ambient light conditions produced by various illumination sources. For example, if ambient light is supplied by a tungsten filament lamp, then excess yellow should be selectively removed from the image. On the other hand, different light sources require different excess colors to be removed depending upon the various conditions under which the image was produced. Once the color to be removed has been determined, then, in one embodiment, correction factors used for processing the digital image are then supplied by the correction factors unit at 610. For example, in the case where the image processor is utilizes a ramp type correction algorithm discussed in detail below, the correction factors supplied provide a color range and a drop off range suitable for the correcting excess color due to ambient light.

At 612, a pixel counter is initialized and a pixel count enhancement threshold is set. In the described embodiment, the pixel count provides a cumulation of all pixels constituting the digital image for which correction is deemed appropriate. For example, in the case where a ramp algorithm is used, those pixels having a hue component within the range of hues defined by the ramp function and having saturation values greater than a saturation threshold are deemed to be in need of color correction. A typical ramp algorithm uses a ramp function as described with reference to FIGS. 8 through 10 to ascertain which pixels are to be processed as well as the degree of processing for each pixel. Along those lines, the pixel count enhancement threshold provides what, in some embodiments, is a user supplied minimum pixel count that determines whether or not the image as a whole is to be enhanced. Once the pixel counter has been initialized and the pixel count threshold has been set, for each pixel in the image, a determination is made at 613 whether the pixel's saturation value is greater than a saturation threshold. If the saturation value is not greater than the saturation threshold, then that pixel is not color corrected. If, however, that pixel's color component is greater that the saturation threshold, then a determination is made at 614 whether or not the hue component of the pixel under study is such that correction is required.

Continuing the example, correction may be required when the particular pixel's saturation value is greater than a saturation threshold and its hue component falls within a particular range of hue component values. In one embodiment, the range of hue component values are defined by a ramp range (associated with a particular ramp algorithm) that is defined at 610. Therefore, if a pixel's saturation value is determined to be greater than the saturation threshold and its hue component value falls within the ramp range, the pixel counter is incremented by "1" at 615. On the other hand, if the pixel's saturation value is not greater than the saturation threshold or its hue component is not within the ramp range it is not incremented.

A determination is made at 616 whether or not there are additional pixels in the digital image to be evaluated for processing. If there are additional pixels to be evaluated for processing, then the next pixel is evaluated and control is passed to 613 such that the loop 613–616 is repeated until there are no additional pixels in the digital image to be evaluated for processing. When there are no additional pixels, control is passed to 618 where a determination is made whether or not the current pixel count is greater than or equal to the pixel count threshold. If the pixel count is not greater than or equal to the pixel count threshold, then the digital image will not be enhanced. In this case, the original image is output to a display device at 620.

On the other hand, if the pixel count is greater than or equal to the pixel count threshold, then the digital image is enhanced at 622. After the digital image has been enhanced, the enhanced digital image is converted to an appropriate color space at 624. The enhanced digital image is then output to the display device at 626.

Figure 7:
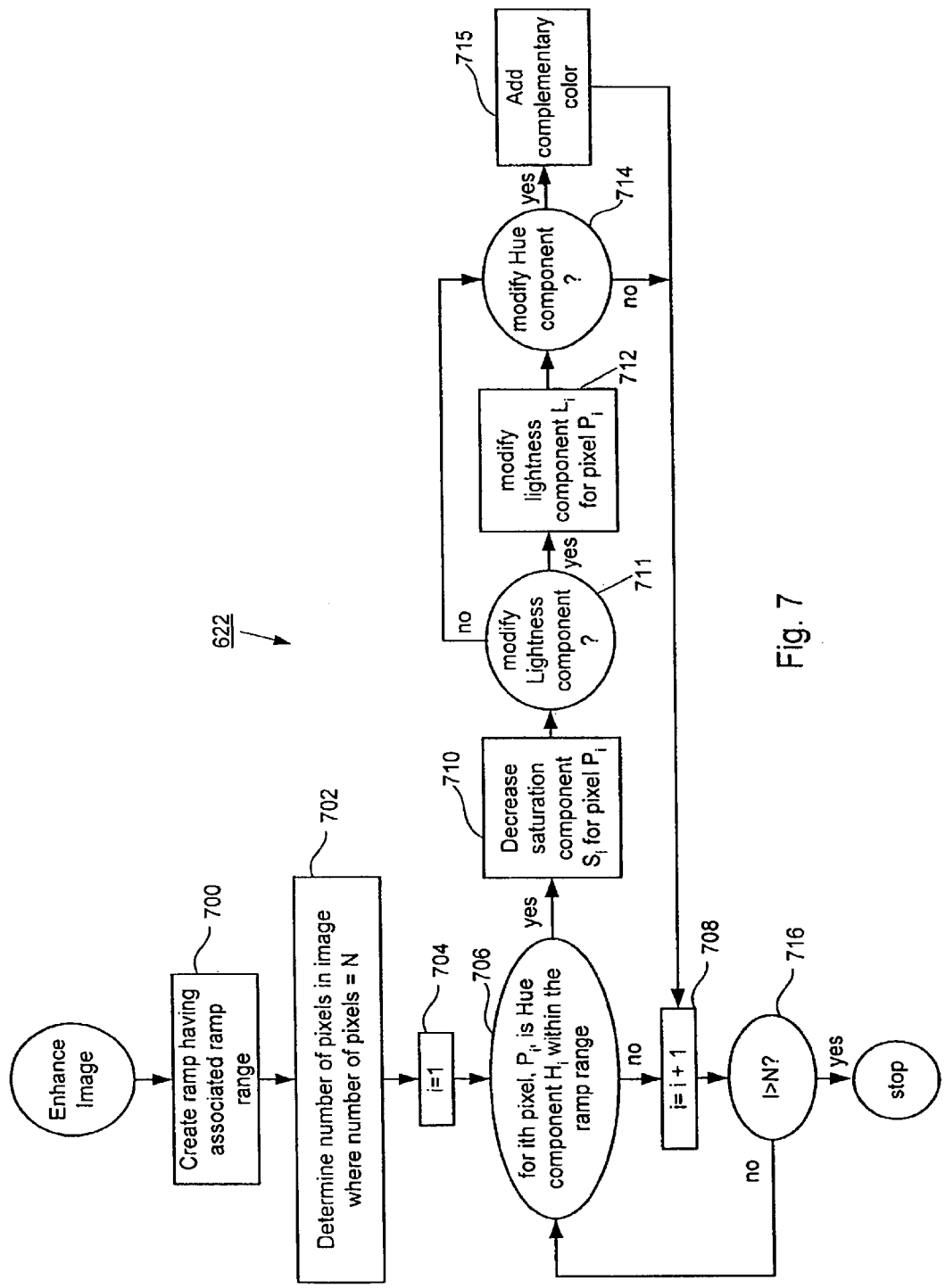
FIG. 7 shows a flowchart detailing a digital image enhancing process in accordance with an embodiment of the invention.

Referring now to FIG. 7 detailing the process 622 for enhancing a digital image in accordance with an embodiment of the invention is further described. It should be noted that for the sake of this discussion only, the digital image has been converted to HLS color space. It should be noted, however, that as long as the color correction factors are appropriately selected, any hue-based color space can also be used.

Figure 8:
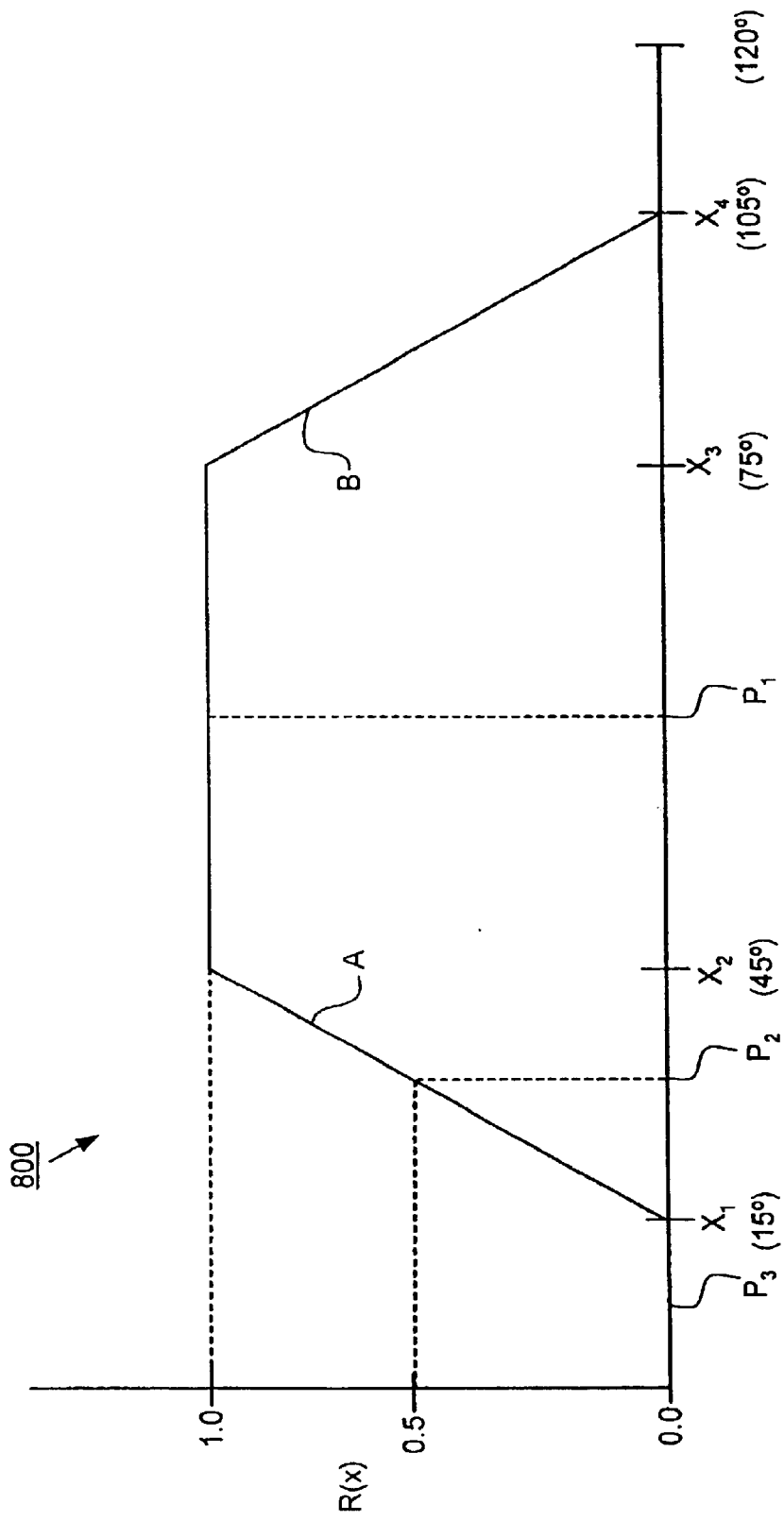
FIG. 8 shows a color ramp that can be used to determine whether or not a pixel requires color processing in accordance with an embodiment of the invention.
Figure 9:
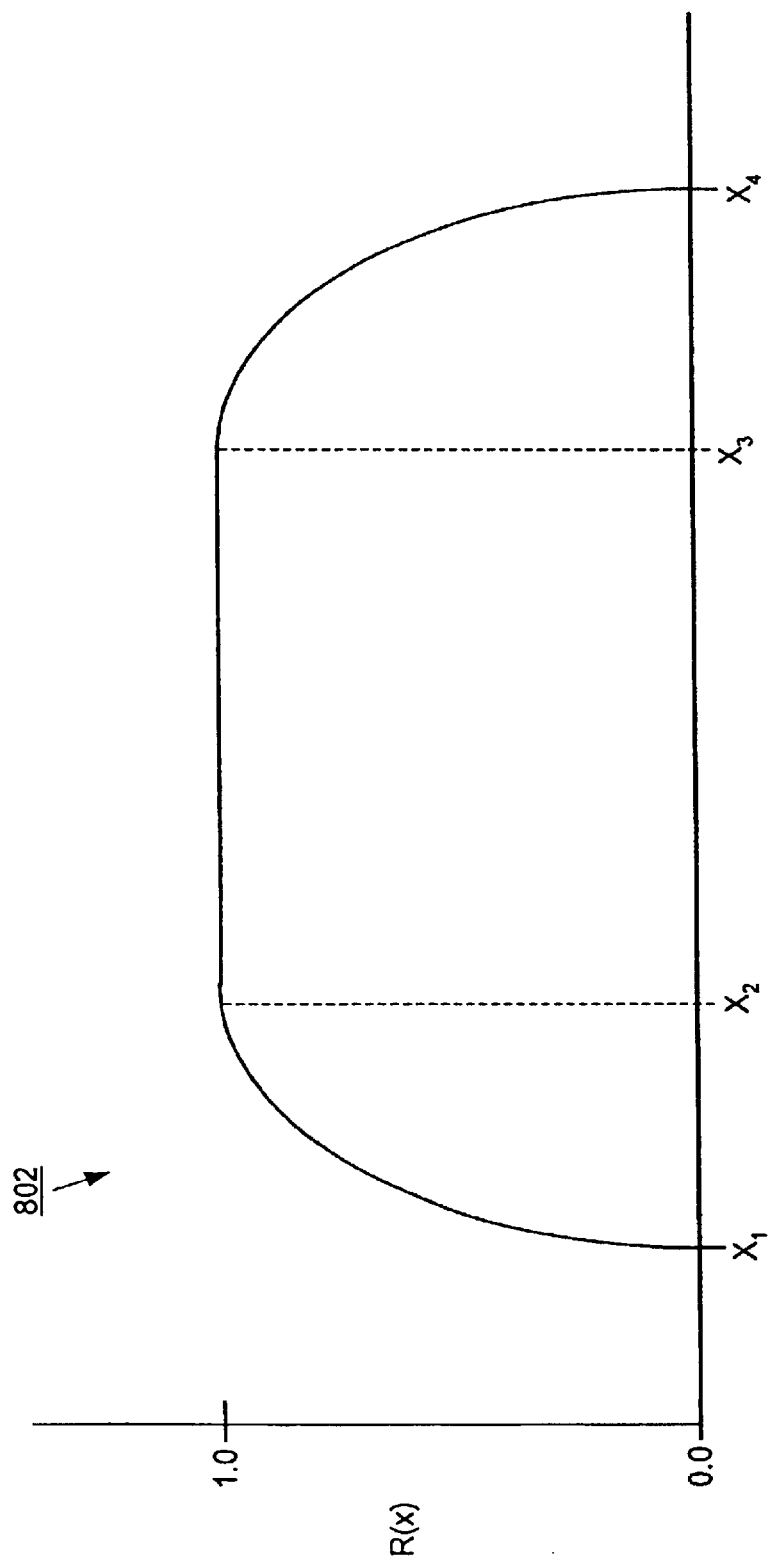
FIG. 9 shows a color ramp with a non-linear ramp up and ramp down function in accordance with an embodiment of the invention.
Figure 10:
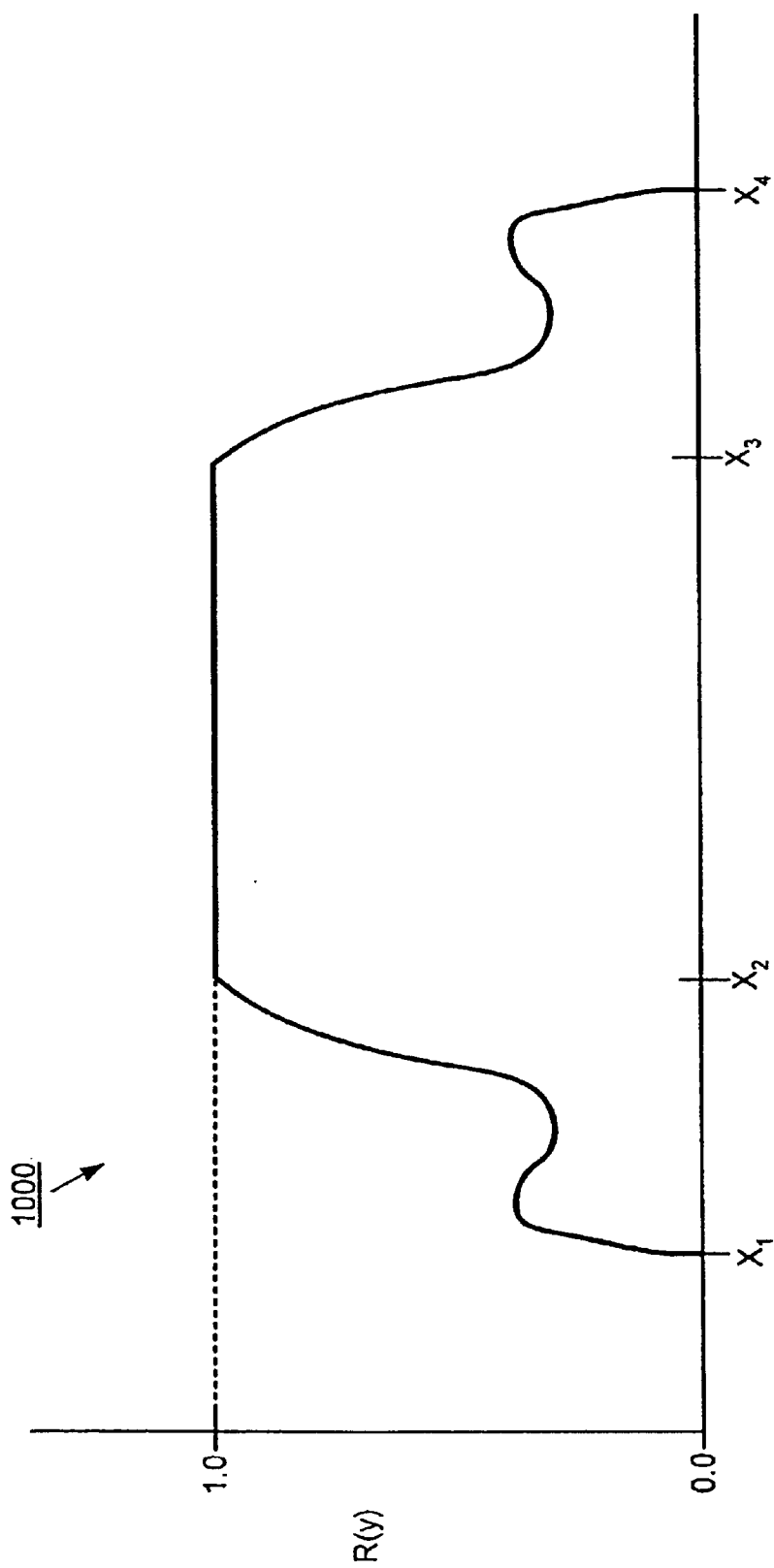
FIG. 10 shows a color ramp with a ramp up and ramp down function that is defined by a cubic parabaloid in accordance with an embodiment of the invention.

The process 622 begins at 700 by creating a ramp having an associated ramp range such as shown in FIGS. 8–10. At 702, the number of pixels in the digital image are determined, where the number of pixels is equal to N. At 704, a pixel counter "i" is initialized to "1" after which a determination is made at 706 whether or not the hue component $H_{\theta i}$ of the ith pixel $P_i$ is within the ramp range. If the hue component $H_{\theta i}$ of the ith pixel $P_i$ is not within the ramp range, then at 708, the pixel counter is incremented by "1". On the other hand, if the hue component $H_{\theta i}$ does fall within the ramp range, then the saturation component $S_i$ of the ith pixel $P_i$ is modified at 710. In one embodiment, the modification of the saturation component $S_i$ is based upon the correction factors provided by the correction factors unit that are based upon the ambient light color temperature. By way of example, in one particular implementation of the invention, the saturation component $S_i$ can be modified according to the following relation (where a color correction factor, "saturation Adjustment" has a default value, in a particular embodiment, of –60):

If saturationAdjustment >0.0, then $$S_{i(new)} = S_{i(old)} + \text{saturationAdjustment} * (1.0 - S_{i(old)}) * R(H_{i(old)}))$$

else, $$S_{i(new)} = S_{i(old)} + (\text{saturationAdjustment} * S_{i(old)}) * R(H_{i(old)}))$$

where $R(H_{i(old)})$ is a hue based multiplication factor discussed with reference to FIG. 8.

At 711, a determination is made whether or not the lightness component $L_i$ is to be modified. If it is determined that the lightness component $L_i$ is to be modified, then at 712, the lightness component $L_i$ is modified according to the correction factors already provided otherwise control is passed to 714. Next, a determination at 714 is then made whether or not the hue component $H_{\theta i}$ requires modification. If it is determined that the hue component $H_{\theta i}$ does require modification, then any hue component considered to be appropriate can be added. In one implementation, a complementary color component is added to the hue component $H_{\theta i}$ at 715. In either case, control is then passed back to 708.

After the pixel count has been incremented at 708, a determination is made at 716 whether or not the pixel count is greater then the number of pixels N in the digital image. In other words, was the just previous pixel the last pixel in the digital image? If the just previous pixel was not the last pixel, then control is passed back to 706, otherwise processing stops and control is passed back to 624.

In one embodiment of the invention, a color ramp 800 as illustrated in FIG. 8 can be created at 700 and be used to determine whether or not a pixel requires color processing. For this example, the digital image has been converted to a hue-based color space, such as HLS, or HSV. In this case, therefore, the abscissa spans a range of hue components $H_\theta$ (represented by an angular distribution) from 0 degrees to 120 degrees representing pure red to pure green and all hues therebetween. In the example, the ramp function $R(H_{iold})$ 800 is defined by a set of ramp coefficients ($X_1$, $X_2$, $X_3$, and $X_4$) based upon the color to be removed that in turn, is based upon the ambient color temperature. For example, for incandescent lighting in an HLS color space, $X_1$ is approximately 15°, $X_2$ is approximately 45°, $X_3$ is approximately 75°, and $X_4$ is approximately 105°. As shown $X_1$ is related to $X_2$ by a linear ramp up function "A". Similarly, a ramp down function "B" characterizes the linear relationship between $X_3$ and $X_4$.

Of course, any function, such as 802 as shown in FIG. 9, can be used with the invention. In this way, there is a relatively smooth transition between those pixels not requiring processing (i.e., having a hue component $H_\theta$ less than approximately 15° or greater than approximately 75°) and those requiring some degree of color correction. By way of example, in FIG. 8, a pixel $P_1$ having a hue component $H_{\theta i}$ of approximately 60° would have a corresponding ramp function $R_1(x)$ of approximately 1.0, a pixel $P_2$ having a hue component $H_{\theta 2}$ of approximately 30° would have a ramp function $R_2(x)$ of approximately 0.5, whereas a third pixel $P_3$ having a hue component $H_{\theta 3}$ of approximately 15° would have a ramp function $R_3(x)$ of approximately 0.0.

It is one of the advantages of the invention is that for any particular light source (and therefore an associated color temperature) any value of ramp coefficients ($X_1$, $X_2$, $X_3$, and $X_4$) can be provided depending on the particular light source. For example, if a fluorescent light source is used, then the ramp coefficients ($X_1$, $X_2$, $X_3$, and $X_4$) can be (195, 225, 255, 285) corresponding to hue components $H_\theta$ (195°, 225°, 255°, 285°), respectively. It should be noted that other possible ramp coefficients are possible as well.

FIG. 10 illustrates a cubic parabolic ramp function 1000 in accordance with an embodiment of the invention.

Figure 11:
FIG. 11 is a photograph prior to color correction.

FIG. 11 is a photograph prior to color correction.

Figure 12:
FIG. 12 is the photograph of FIG. 11 subsequent to "after taken" color correction in accordance with an embodiment of the invention.

FIG. 12 is the photograph of FIG. 11 subsequent to "after taken" color correction in accordance with an embodiment of the invention.

Figure 13:
FIG. 13 is another photograph prior to color correction.

FIG. 13 is another photograph prior to color correction.

Figure 14:
FIG. 14 is the photograph of FIG. 13 subsequent to "after taken" color correction in accordance with an embodiment of the invention.

FIG. 14 is the photograph of FIG. 13 subsequent to "after taken" color correction in accordance with an embodiment of the invention.

Figure 15:
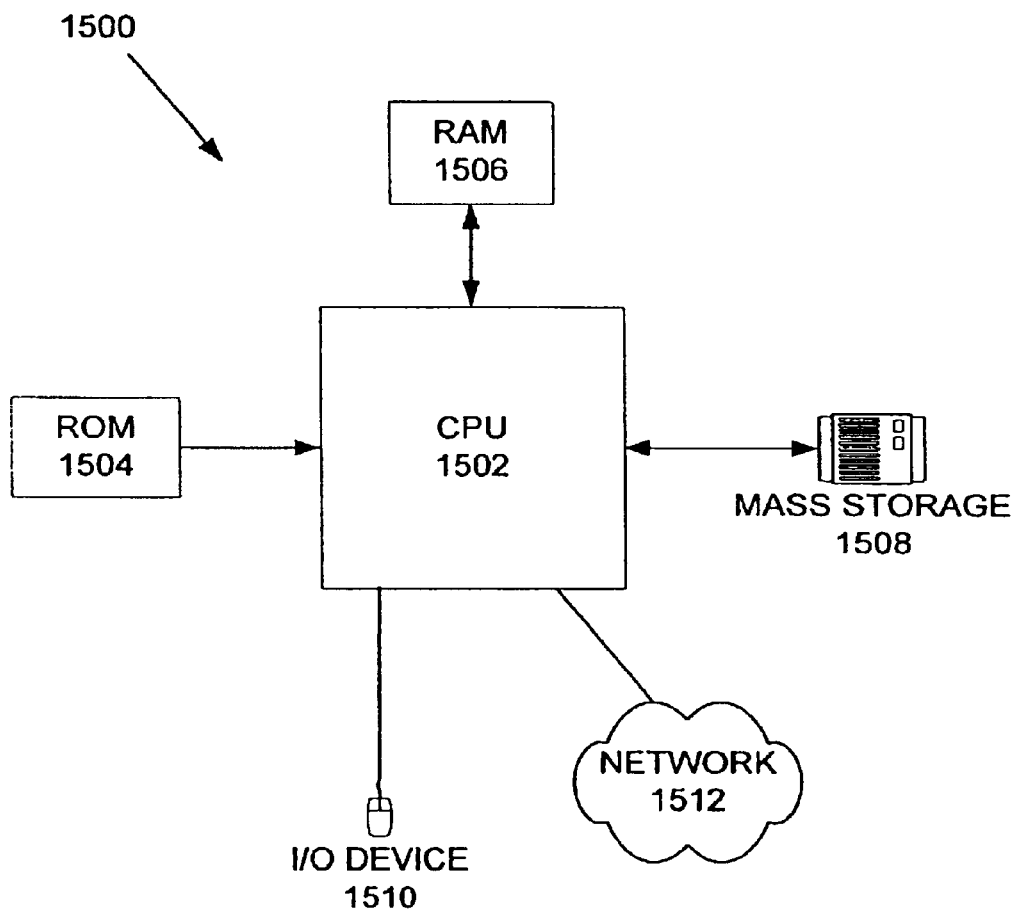
FIG. 15 illustrates a computer system employed to implement the invention.

FIG. 15 illustrates a computer system 1500 employed to implement the invention. The computer system 1500 or, more specifically, CPUs 1502, may be arranged to support a virtual machine, as will be appreciated by those skilled in the art. As is well known in the art, ROM acts to transfer data and instructions uni-directionally to the CPUs 1502, while RAM is used typically to transfer data and instructions in a bi-directional manner. CPUs 1502 may generally include any number of processors. Both primary storage devices 1504, 1506 may include any suitable computer-readable media. A secondary storage medium 1508, which is typically a mass memory device, is also coupled bi-directionally to CPUs 1502 and provides additional data storage capacity. The mass memory device 1508 is a computer-readable medium that may be used to store programs including computer code, data, and the like. Typically, mass memory device 1508 is a storage medium such as a hard disk or a tape which generally slower than primary storage devices 1504, 1506. Mass memory storage device 1508 may take the form of a magnetic or paper tape reader or some other well-known device. It will be appreciated that the information retained within the mass memory device 1508, may, in appropriate cases, be incorporated in standard fashion as part of RAM 1506 as virtual memory. A specific primary storage device 1504 such as a CD-ROM may also pass data uni-directionally to the CPUs 1502.

CPUs 1502 are also coupled to one or more input/output devices 1510 that may include, but are not limited to, devices such as video monitors, track balls, mice, scanners, PC-card readers, digital cameras, digital video, remote control units for TVs, VCRs, DVD players, and the like, keyboards, microphones, touch-sensitive displays, transducer card readers, magnetic or paper tape readers, tablets, styluses, voice or handwriting recognizers, or other well-known input devices such as, of course, other computers. Finally, CPUs 1502 optionally may be coupled to a computer or telecommunications network, e.g., an Internet network or an intranet network, using a network connection as shown generally at 1512. With such a network connection, it is contemplated that the CPUs 1502 might receive information from the network, or might output information to the network in the course of performing the above-described method steps. Such information, which is often represented as a sequence of instructions to be executed using CPUs 1502, may be received from and outputted to the network, for example, in the form of a computer data signal embodied in a carrier wave. The above-described devices and materials will be familiar to those of skill in the computer hardware and software arts.

While the present invention has been described as being used with a digital video system, it should be appreciated that the present invention may generally be implemented on any suitable digital image system. Specifically, the methods of using a hue-based color enhancement scheme may generally be implemented in any imaging system without departing from the spirit or the scope of the present invention. By way of example, the invention can be used to provide enhanced MRI images, X-ray images and the like for those applications in which enhanced features are advantageous such as satellite imaging. Therefore, the present examples are to be considered as illustrative and not restrictive, and the invention is not to be limited to the details given herein, but may be modified within the scope of the appended claims along with their full scope of equivalents.

What is claimed is:

1. A method of automatically color correcting a digital image taken under an ambient light source, comprising:

(a) converting the digital image to a selected color space, wherein each of the pixels has an associated set of color space components;

b) determining a characteristic color temperature of the ambient light source;

(c) selecting a first color component and a second color component of the set of color space components having a first color component value and a second color component value, respectively;

(d) determining the number of pixels of the digital image having both their respective first color component value within a predetermined range of first color component values and their second color component values within a predetermined range of second color component values, wherein the range of first color component values and the range of second color component values are based upon the characteristic ambient color temperature; and (e) if the number of pixels from (d) is greater than a pixel threshold value, then for each pixel in the digital image having its respective first color component value within the predetermined range and its second color component value within the predetermined range of second color component values, modifying that pixel's set of color components.

2. A method as recited in claim 1, wherein the selected color space is a hue-based color space selected from the group comprising: Hue, Saturation, and Value (HSV) color space, Hue, Saturation, Intensity (HSI) color space, Hue, Light, Saturation (HLS) color space, Hue, Saturation, and Brightness (HSB), and Tek HVC (Hue, Value, and Chroma).

3. A method as recited in claim 2, wherein the selected color space is the HLS color space wherein the set of color space components includes a hue component, a lightness component, and a saturation component, wherein the first color component is the hue component and the second color component is the saturation component.

4. A method as recited in claim 3, wherein the determining (b) comprises:

determining a predominant frequency of ambient light; and assigning the ambient color temperature based upon the determined predominant frequency.

5. A method as recited in claim 3, wherein the determining (b) comprises:

manually inputting a selected ambient light source; and assigning the ambient color temperature based upon the selected ambient light source.

6. A method as recited in claim 5, wherein the assigning is based upon a look up table that cross relates the selected ambient light source with the ambient color temperature.

7. A method as recited in claim 4 or 6, wherein the predetermined range of hue component values is based upon a ramp function.

8. A method as recited in claim 7, wherein the ramp function is formed of a first portion contiguous with a second portion which, in turn, is contiguous with a third portion.

9. A method as recited in claim 8, wherein the first portion is a monotonically increasing linear function having a first portion minimum value at a first hue component $H_1$ and a first portion maximum value at a second hue component $H_2$ and wherein the second portion is a constant value being the maximum value, and wherein the third portion is a monotonically decreasing linear function having a third portion maximum value at the hue component $H_3$ being the maximum value and a third portion minimum value at a hue component $H_4$.

10. A method as recited in claim 9, wherein the predetermined range of hue values is the range of hue components between approximately $H_1$ and $H_4$.

11. A method as recited in claim 8, wherein the first portion and the third portions of the ramp function are a cubic parabolic function having the hue component as an independent variable.

12. A method as recited in claim 7, wherein the selected ambient light source is selected from the group consisting of an incandescent light source and a fluorescent light source.

13. An apparatus for enhancing a digital image made up of pixels by removing a particular color, comprising:

a first means for converting the digital image to a selected color space, wherein each of the pixels has an associated set of color space components;

a second means coupled to the first means for determining a characteristic color temperature of the ambient light source;

a third means coupled to the second means for selecting a first color component and a second color component of the set of color space components having a first color component value and a second color component value, respectively;

a fourth means coupled to the third means for determining the number of pixels of the digital image having both their respective first color component value within a predetermined range of first color component values and their second color component values within a predetermined range of second color component values, wherein the range of first color component values and the range of second color component values are based upon the characteristic ambient color temperature; and a fifth means for modifying that pixel's set of color components when the number of pixels from determined by the fourth means is greater than a pixel threshold value, then for each pixel in the digital image having its respective first color component value within the predetermined range and its second color component value within the predetermined range of second color component values.

* * * * *